United States Patent [19]

Kooijmans et al.

[11] Patent Number: 5,064,913

[45] Date of Patent: Nov. 12, 1991

[54] GLYCIDYLESTER-ANHYDRIDE ADDUCTS AND EPOXY RESIN CURING AGENTS THEREFROM

[75] Inventors: Petrus G. Kooijmans; Johannes M. Van Der Mark, both of Amsterdam, Netherlands; Willem Karzijn, Louvain-la-Neuve, Belgium

[73] Assignee: Shell Oil Company, Houston, Tex.

[21] Appl. No.: 658,621

[22] Filed: Feb. 21, 1991

[30] Foreign Application Priority Data

Feb. 22, 1990 [GB] United Kingdom ................. 9004013

[51] Int. Cl.$^5$ ........................ C08L 63/10; C08L 67/02
[52] U.S. Cl. .................................... 525/438; 528/112; 528/115; 528/297; 523/400
[58] Field of Search ................. 525/438, 112, 115, 297

[56] References Cited

U.S. PATENT DOCUMENTS

| | | | |
|---|---|---|---|
| 3,624,180 | 11/1971 | Schmid | 525/438 |
| 4,026,862 | 5/1977 | Smith et al. | 528/115 |
| 4,035,321 | 7/1977 | Shahidi et al. | 525/438 |
| 4,073,775 | 2/1978 | Matsuo et al. | 528/112 |
| 4,478,985 | 10/1984 | Bekooij et al. | 525/530 |
| 4,524,161 | 6/1985 | Feuerhahn | 523/414 |
| 4,734,468 | 3/1988 | Marx | 525/524 |
| 4,933,379 | 6/1990 | Scholten et al. | 523/404 |

FOREIGN PATENT DOCUMENTS 2558723 7/1977 Fed. Rep. of Germany .

*Primary Examiner*—Paul R. Michl
*Assistant Examiner*—Christopher P. Rogers

[57] ABSTRACT

An epoxy-based coating formulation includes a curing agent comprising oligomeric adducts of trimellitic anhydride and the glycidyl ester of pivalic acid. Such curing agents having a melting point of from 80 to 110° C., making the epoxy-based formulation suitable for powder coating applications.

9 Claims, No Drawings

GLYCIDYLESTER-ANHYDRIDE ADDUCTS AND EPOXY RESIN CURING AGENTS THEREFROM

BACKGROUND OF THE INVENTION

This invention relates to epoxy resin compositions useful in coating applications. In a specific aspect, the invention relates to curing agents for epoxy resin-based powder coatings.

An important issue in the paint industry is the replacement of solvent-borne coatings by environmentally-acceptable, low-solvent systems. One promising trend is the use of epoxy-based powder coatings which are applied without the use of solvents.

One such powder coating system employs glycidyl esters of alpha-branched $C_{9-11}$ aliphatic monocarboxylic acids as curing agents for the epoxy resin. The resulting powder coatings have excellent color and gloss retention, outdoor durability and hydrolylic stability. These powder coatings, however, typically exhibit melting points below about 65° C., which is undesirably low for melting powder applications, which generally require powders having melting points above about 70° C.

It is therefore an object of the invention to provide an epoxy resin curing agent useful in powder coating formulations.

BRIEF SUMMARY OF THE INVENTION

According to the invention, there is provided a composition comprising an expoxy resin and a curing amount of a reaction product of trimellitic anhydride and the glycidylester of pivalic acid. Such compositions provide powder coating formulations having melting points above about 70° C.

DETAILED DESCRIPTION OF THE INVENTION

The invention centers around the finding that oligomeric adducts of trimellitic anhydride and the glycidylester of pivalic acid can be prepared that have melting points within the range of from about 80° to about 110° C. These adducts are particularly suitable for use as curing agents in epoxy resin powder coatings.

The reaction between trimellitic anhydride and the glycidylester of pivalic acid provides compounds of the formula:

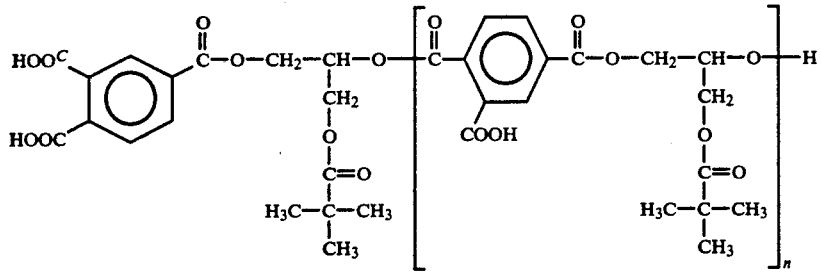

(and anhydride-terminated analogues of these dicarboxylic acids), in which the value of n is typically within the range of from 3 to 8, preferably 4 to 6. Depending on the reaction conditions, some portion of the reaction product may have an anhydride moiety instead of the terminal carboxylic acid groups. The reaction product has an acid value within the range of about 2.4 to about 2.8 meq.g$^{-1}$ and a melting point within the range of about 80° to about 110° C.

The curing agents are prepared by contacting trimellitic anhydride and the glycidylester of pivalic acid under conditions suitable for the formation of the above-described oligomeric reaction product mixture. The reaction can be a catalyzed or a noncatalyzed system. The reaction is preferably carried out in a solvent in the presence of a catalyst. The solvent is preferably a polar organic solvent, such as a ketone (e.g., methyl ethyl ketone) or an ether. The reaction, when a catalyst is used, is preferably a base-catalyzed system. Such basic catalyst, for example, can be an amine, pyridine or an alkali-metal hydroxide. Amines such as benzyldimethylamine are particularly preferred. The reaction is typically carried out until the epoxy groups in the reaction mixture are substantially consumed. When benzyldimethylamine is used as the catalyst, the reaction is typically carried out at about 70° to about 90° C.

The oligomeric adducts have been found to be useful as curing agents for epoxy resins. They are particularly suitable as curing agents for epoxy resin powder coatings.

Generally the epoxy resin component of the invention composition will have a 1,2-epoxy equivalency greater than one and preferably of about 1.5 or more. The epoxy resin may be linear or branched, saturated or unsaturated, aliphatic, cycloaliphatic, aromatic or heterocyclic. Examples of epoxy resins suitable for use in the invention include polyglycidyl ethers of polyhydric compounds, brominated epoxides, epoxy novolacs or similar polyhydroxyphenol resins, polyglycidyl ethers of glycols or polyglycols, and polyglycidyl esters of polycarboxylic acids. Preferably the epoxy resins are selected from the multitude of commercially available polyglycidyl ethers of polyhydric phenols. Polyglycidyl ethers of polyhydric phenols can be produced, for example, by reacting an epihalohydrin with a polyhydric phenol in the presence of an alkali. Examples of suitable polyhydric phenols include: 2,2-bis(4-hydroxyphenyl) propane (bisphenol-A); 2,2-bis(4-hydroxy-tert-butylphenyl) propane; 1,1-bis(4-hydroxyphenyl) ethane; 1,1-bis(4-hydroxyphenyl) isobutane; 2,2-bis(4-hydroxytertiarybutylphenyl) propane; bis(2-hydroxynapthyl) methane; 1,5-dihydroxynaphthalene; 1,1-bis(4-hydroxy-3-alkylphenyl) methane; 1,5-dihydroxynaphthalene; 1,1-bis(4-hydroxy-3-alkylphenyl) ethane; bis(4-hydroxyphenyl) methane and the like. Most preferred are the diglycidyl ethers of dihydric aromatic phenols, particularly 2,2-bis(4-hydroxyphenyl) propane, a commercial example of which is EPIKOTE ® 1055 (a solid diglycidyl ether of bisphenol-A). Advancement of a liquid resin with bisphenol-A can produce a solid resin highly suitalbe for powder coating formulations, such as described in U.S. Pat. No. 3,477,990 and U.S. Pat. No. 4,734,468.

The curing of the epoxy resin with the above-described adduct will normally proceed via prolonged heating at a temperature of at least 90° C., preferably at least 120° C., for a time effective to cure the epoxy resin. The epoxy resin compositions of the invention may include other additives, e.g., catalysts, accelerators, pigments, fillers, light stabilizers and antioxidants. When the resins and the curing agents are used in a powder coating composition, such conventional powder coating additives as flow control agents, anti-popping agents, and powder flow materials may also be included.

The powder coating composition typically can be prepared by melt blending the ingredients and then pulverizing after the blend cools and solidifies. The coating powder composition can be applied by electrostatic spraying, by use of a fluidized bed and other methods used to apply powder coatings.

In addition to epoxy resin based powder coatings, solvent-borne baking enamels can be cured with the adducts.

EXAMPLE

An acid-functional adduct was prepared by reacting 173 g of the glycidylester of pivalic acid with 192 g of trimellitic anhydride in 156 g of methylethylketone and 0.9 g benzyldimethylamine catalyst at 70° to 90° C. The reaction was continued until the epoxy group content of the nonvolatile portion of the reaction mixture had decreased to 0.05 eq.kg$^{-1}$ (4 hours).

The oligomeric adduct had a melting point range of 80° to 110° C. and an acid value of 2.65 eq.kg$^{-1}$; $\overline{M}_z$ was 6700 and $\overline{M}_w.\overline{M}_n^{-1}$ was 2.08, as determined by GPC analysis. The storage stability of the adduct was excellent, no blocking being observed after four weeks at 40°C.

The adduct was evaluated in the curing of an EPIKOTE® 1055 solvent-borne coating formulation. The amount of adduct was stoichiometric. The solvent was butyl OXITOL® glycol ether. 0.5% w catalyst AMC-2 (a chromium octoate salt from Aerojet General, Inc.) was employed as curing accelerator.

The coating solution was applied in a film thickness of 20 microns by bar coating on bare steel panels. Baking for 20 minutes was effected at 120° C., 140° C. and 160° C., respectively.

|  | Curing temperature: | | |
| --- | --- | --- | --- |
|  | 120° C. | 140° C. | 160° C. |
| MEK resistance, double rubs | <10 | 50-80 | 100 |
| Gloss Gardner, 45° C. | 87 | 95 | 95 |
| Koenig hardness, sec | 148 | 158 | 156 |
| Direct impact, inch/lbs | <10 | >80 | >80 |
| Reverse impact, inch/lbs | <10 | >80 | >80 |

Coatings cured at temperatures as low as 140° C. exhibited a methyl ethyl ketone resistance of more than 50 double rubs. The coatings were very smooth and coherent, showing an attractive balance between flexibility (impact resistance >80 inch/lbs) and hardness (Koenig hardness >148 s).

We claim:

1. A curable composition comprising:
   (a) an epoxy resin; and
   (b) a curing agent for the epoxy resin comprising a reaction product of a glycidylester of pivalic acid and trimellitic anhydride, said reaction product having an acid value within the range of about 2.4 to about 2.8 meq.g$^{-1}$ and a melting point within the range of about 80 to about 110° C.

2. The composition of claim 1 in which said curing agent comprises a compound of the formula:

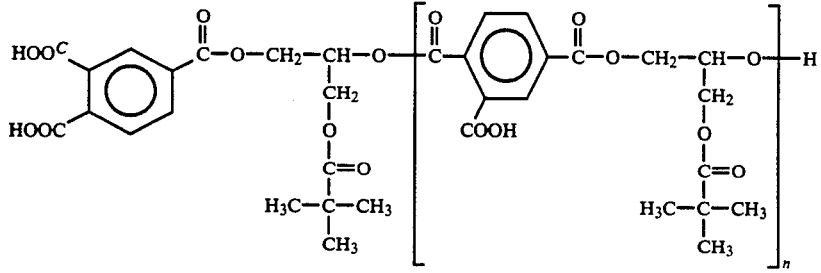

in which n is a number within the range of from 3 to 8.

3. The composition of claim 2 in which n is within the range of from 4 to 6.

4. The composition of claim 3 further comprising (c) a cure accelerator.

5. The composition of claim 3 wherein the epoxy resin is a diglycidyl ether of a dihydric aromatic phenol.

6. The composition of claim 3 wherein the epoxy resin is an advanced diglycidyl ether of bisphenol-A.

7. A powder coating composition comprising the composition of claim 1.

8. An article coated with the powder coating composition of claim 7.

9. A solvent-borne coating composition comprising the composition of claim 3.

* * * * *